United States Patent [19]

Burandt et al.

[11] Patent Number: 4,555,978

[45] Date of Patent: Dec. 3, 1985

[54] MULTIPLE DISPLACEMENT MOTOR DRIVEN POWER DRIVE UNIT

[75] Inventors: Wesley A. Burandt; Allyn M. Aldrich, both of Rockford, Ill.

[73] Assignee: Sundstrand Corporation, Rockford, Ill.

[21] Appl. No.: 580,074

[22] Filed: Feb. 14, 1984

[51] Int. Cl.[4] .......................... F01B 13/04; F16H 37/06

[52] U.S. Cl. .......................................... 91/506; 417/216; 74/655; 74/661; 74/675

[58] Field of Search ...................... 74/655, 655 B, 661, 74/675, ; 91/504–506; 417/216

[56] References Cited

U.S. PATENT DOCUMENTS

| | | | |
|---|---|---|---|
| 3,535,984 | 10/1970 | Anderson | 91/506 |
| 3,662,550 | 5/1972 | Lichtfuss | 60/53 R |
| 3,694,108 | 9/1972 | Pensa | 91/506 |
| 3,977,302 | 8/1976 | Eickmann | 74/661 |
| 4,155,288 | 5/1979 | Glaze | 91/363 A |
| 4,191,094 | 3/1980 | Flippo | 91/506 |
| 4,210,066 | 1/1980 | Aldrich | 91/506 |

FOREIGN PATENT DOCUMENTS

| | | | |
|---|---|---|---|
| 1525571 | 9/1978 | United Kingdom | 74/661 |

*Primary Examiner*—William L. Freeh

*Attorney, Agent, or Firm*—Wood, Dalton, Phillips, Mason & Rowe

[57] ABSTRACT

A multiple displacement motor driven power drive unit having two separate hydraulic systems each with a variable displacement hydraulic motor having its output connected to a torque summing gear train. A control provides for operation of one or the other of the motors at full displacement while the other motor is at zero displacement and free-wheels. There is a manual mechanical control operation with both motors simultaneously set at one-half of full displacement and driving the torque summing gear train. The change in motor displacements to one-half full displacement accomplishes velocity summing within the hydraulics. The multiple displacement motor driven power drive unit accomplishes the power efficiency of a multiple motor driven power drive unit utilizing a speed summing gear train with fixed displacement motors, but without the complexities associated with the use of a speed summing gear train and brakes.

11 Claims, 1 Drawing Figure

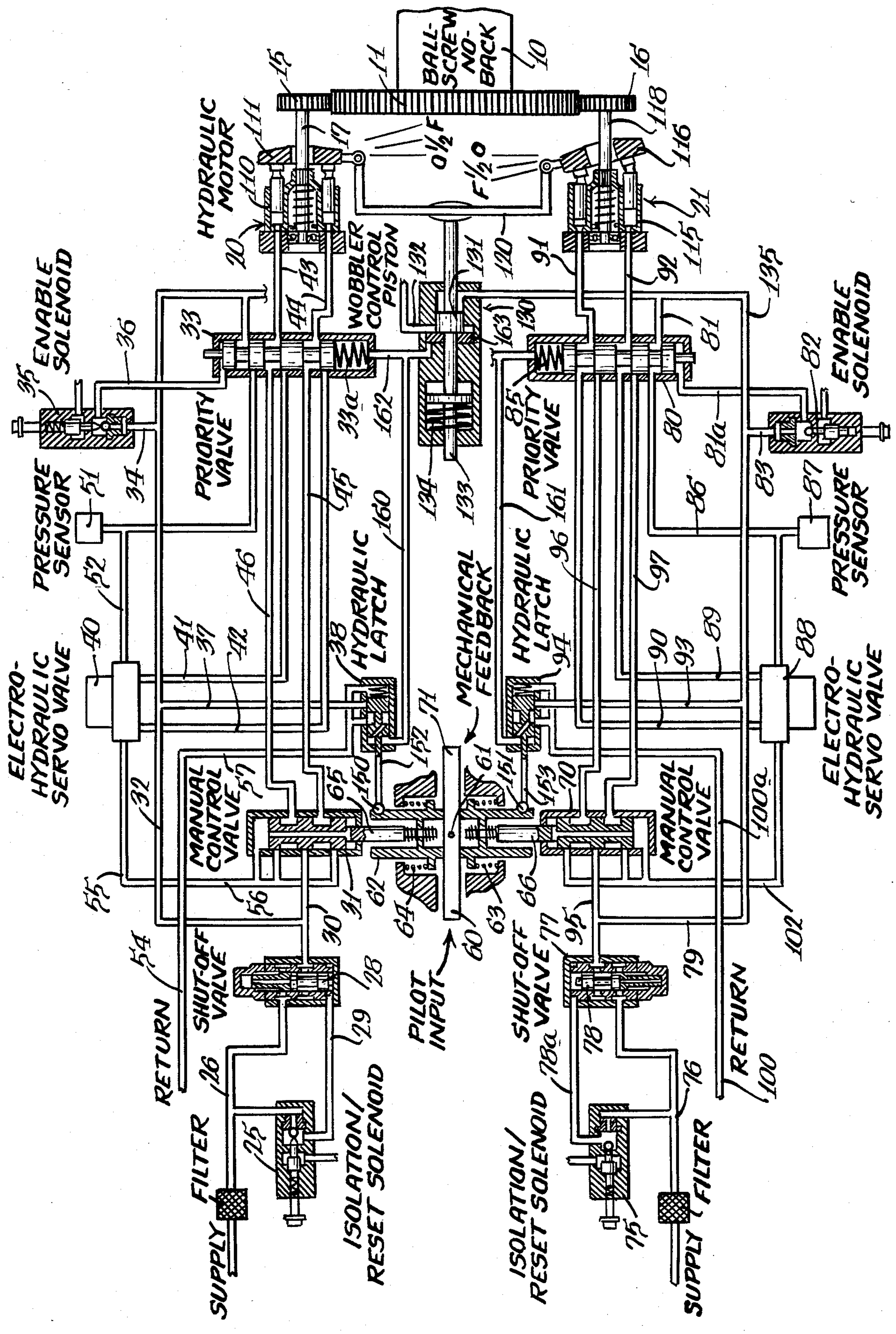
BALL-SCREW NO-BACK
HYDRAULIC MOTOR
WOBBLER CONTROL PISTON
ENABLE SOLENOID
PRIORITY VALVE
PRESSURE SENSOR
HYDRAULIC LATCH
MECHANICAL FEEDBACK
HYDRAULIC LATCH
PRIORITY VALVE
ENABLE SOLENOID
PRESSURE SENSOR
ELECTRO-HYDRAULIC SERVO VALVE
MANUAL CONTROL VALVE
MANUAL CONTROL VALVE
ELECTRO-HYDRAULIC SERVO VALVE
RETURN
SHUT-OFF VALVE
PILOT INPUT
SHUT-OFF VALVE
RETURN
FILTER
SUPPLY
ISOLATION/ RESET SOLENOID
ISOLATION/ RESET SOLENOID
FILTER
SUPPLY

MULTIPLE DISPLACEMENT MOTOR DRIVEN POWER DRIVE UNIT

DESCRIPTION

TECHNICAL FIELD

This invention relates to a multiple displacement motor driven power drive unit for operating a member or members particularly in certain flight control actuation systems with such member being a trimmable horizontal stabilizer. The power drive unit has two separate hydraulic systems, each having a variable displacement hydraulic motor with one motor normally in operation to drive the member, and with the other hydraulic system being redundant. In the event there is a failure in the first hydraulic system, the other system can take over to assure continued normal operation. There is also emergency mechanical control with the hydraulic motors in both hydraulic systems operating.

The power drive unit includes a torque summing gear train connected to the output shafts of the motors and the hydraulic motors have their displacements interrelated whereby summing of the motor torques occurs in the torque summing gear train, and velocity summing which is required for operation of the flight control actuation system in emergency control for an increased operating speed occurs within the hydraulic components by varying the displacement of the hydraulic motors.

BACKGROUND ART

A prior power drive unit has used two separate hydraulic systems, each having a fixed displacement motor with the output shafts thereof connected to a speed summing gear train. In such a unit, one of the motors is normally operable with the other motor in a standby mode, and if there is a failure in one hydraulic system, the other hydraulic system can take over. In an emergency situation, there is a manual override feature to place both motors in operation and through the speed summing gear train, the flight control actuation system operates at approximately two times its normal rate of speed. This power drive unit (as opposed to a fixed displacement torque summing gear train configuration) conserves hydraulic power as the flow demand of each of the hydraulic motors remains constant in order to double the output speed of the power drive unit while maintaining constant output torque.

It is also known to use a torque summing gear train with plural fixed displacement hydraulic motors to drive a member.

A speed summing gear train is power efficient. The speed summing gear train primarily takes two or more inputs such as the inputs from two hydraulic motors and sums the velocity of these inputs to obtain a single output. The torque of the output remains constant regardless of the number of inputs. As each input is added or subtracted, the gear ratio changes to, in effect, increase or decrease the ratio from the motor to the output such that constant torque remains on the output when multiplied by the number of motors. However, the velocity either increases or decreases as a motor is added or subtracted because of the ratio change.

An example of a speed summing gear train is a simple differential gear train with one motor connected to the sun gear and a second motor connected to the ring gear. With the sun gear being driven and the ring gear not driven by the other motor and locked, the planetary carrier of the differential (on a 2:1 ratio differential) would move at one-half the speed of the sun gear while increasing the torque on the sun gear by 2:1. Conversely, with the ring gear being driven and the sun gear locked, the planetary carrier would again move at twice the speed of the motor driving the ring gear, and with twice the torque. With both motors operating, the planetary carrier will operate at the same speed as the ring gear and the sun gear and there will be no gear ratio. Therefore, there will be no multiplication of torque, however, there will be no reduction in speed from the motors to the output. Therefore, you have the torque of two motors which is the same as one motor with a 2:1 ratio through the gear train; however, the output speed from the differential is motor speed rather than one-half of motor speed.

A prime advantage resulting from the use of the speed summing gear train is that a given load can always be moved no matter how many motors are driving and the motors will consume a given amount of hydraulic power or electric power per motor when moving a load. Output speed can be increased or decreased by adding motors or subtracting motors. If the drive of one motor is lost instantaneously, the ability to drive the output is not lost, but there is a loss of one-half the speed of the output member (in a two motor configuration).

In a torque summing gear train, the gear train is very simple with a single gear accepting the inputs from two or more motors. Torque on the single gear then becomes the sum of the torque on all of the motors. Speed of the single gear does not change by adding or subtracting more motors, but only the torque changes, hence the term, torque summing gear train. The primary advantage of the torque summing gear train is that you do not lose control of the load when there is a mechanical failure in one of the inputs to the single gear because the input from the other motor is connected directly to the gear. There is no requirement for grounding of the failed system such as by use of a brake to react to torque from the motor that is still operating as is required in a speed summing gear train.

The principal disadvantage of the torque summing gear train (requiring a given torque output) is that each input to the summing gear is required to provide the torque and the speed for normal operation; therefore, each motor must be capable of running at full speed and full torque, thereby consuming twice as much flow (in a two motor system) as a speed summing system using two motors during normal operation. Therefore, in the torque summing gear train when multiple inputs are operating, all inputs except one are being wasted and are consuming power from the power supply without any use thereof.

In the speed summing gear train, all of the inputs are consuming the same proportion of the power from the power supply insuring drive of the load at a given force and at the maximum demanded rate during normal operation. When one motor is lost, for whatever reason, the load can still be moved at a lesser rate; therefore, in normal operation the speed summing gear train is far more efficient than the torque summing gear train.

DISCLOSURE OF THE INVENTION

A primary feature of the invention is to provide a power drive unit utilizing plural variable displacement hydraulic motors for driving an output through a simple torque summing gear train, and which will be as power efficient as driving an output through a more complicated speed summing gear train. More particularly, the hydraulic motors in the hydraulic system have their displacements controlled to achieve speed summing in the hydraulic system to achieve the power efficiency of speed summing while the torque summing is achieved at the mechanical end of the drive through the use of a simple torque summing gear train.

With the use of the torque summing gear train there is no need to ground (brake) a motor which has become inoperative. The efficiency achieved by a speed summing gear train is accomplished by modifying the displacement of the hydraulic motors to achieve a change in gear ratio for increased speed of the output. Assuming a given amount of flow to a hydraulic motor, the motor will have a number of revolutions per unit of time as can be obtained utilizing the amount of flow into the motor divided by the displacement of the motor. If the motor displacement changes, the rotational speed of the motor will change proportionally effecting a ratio change. Assuming the motor is at full displacement and is shifted to one-half of full displacement with the same rate of flow, the speed of rotation thereof will be doubled. The displacement of the motor in addition to controlling the speed of the motor also determines the output torque of the motor. Therefore, with a given amount of hydraulic power, reducing the motor displacement by 50% will result in doubling the speed out while reducing the output torque by 50%. In the invention disclosed herein, ratio change motors drive a torque summing gear train that provides the same operational capability as fixed displacement motors going into a more complex speed summing gear train.

Another feature of the invention is to provide a multiple displacement power drive unit having two independent hydraulic systems, each with a variable displacement hydraulic motor with the outputs of the motors connected to a torque summing gear train, and means for establishing three distinct displacements for each motor to meet various required operating conditions. The displacement positions of the two hydraulic motors are interrelated whereby in one position one motor is at full displacement and the other motor is at zero displacement, a second position in which the relation between the motor displacements is reversed, and a third position wherein both motors are at one-half of full displacement. In the latter position, the speed of each motor is doubled over that when the motor is at full displacement, and thus, the speed summing occurs by setting of the motor displacements and the drive can be through the torque summing gear train which eliminates the need for grounding of one motor in the event there is a failure of such motor.

An additional feature of the invention is to provide a multiple displacement power drive unit as defined in the preceeding paragraph which as a result of not requiring a more complex speed summing gear train and grounding structure as brakes results in a power drive unit that is more reliable, has lower weight, and requires less space.

A further feature of the invention is to provide a multiple displacement power drive unit for driving a member comprising, a torque summing gear train connected to said member, a pair of variable displacement hydraulic motors each having an output shaft connected to said torque-summing gear train and a wobbler plate positionable to set the displacement of the associated motor, an independent hydraulic circuit for each motor, means for setting one of said motors to full displacement and supplying pressure fluid thereto while simultaneously setting the other of said motors to zero displacement and blocking supply of pressure fluid to said other motor to have said one motor drive the member while said other motor free-wheels, and means for setting both motors at one-half of full displacement and supplying pressure fluid to both motors to have both motors drive the member through the torque summing gear train.

BRIEF DESCRIPTION OF THE DRAWING

The FIGURE is a schematic of the multiple displacement motor driven power drive unit.

BEST MODE FOR CARRYING OUT THE INVENTION

The multiple displacement motor driven power drive unit is shown in the Figure and embodies two identical hydraulic systems identified as hydraulic system No. 1 and hydraulic system No. 2.

The power drive unit drives a rotatable member 10 for moving a structural member, for example, a trimmable horizontal stabilizer (not shown) of a flight control system for an aircraft. The member 10 is, for example, a ball screw with an associated no-back mechanism whereby rotation of member 10 is converted into linear movement. The member 10 is driven by a torque summing gear train having a gear 11 fixed thereto and which meshes with gears 15 and 16 connected to the respective output shafts 17 and 18 of variable displacement hydraulic motors, indicated generally at 20 and 21, which are associated one with each of the hydraulic systems.

Hydraulic system No. 1 is described as follows. An isolation/reset solenoid valve 25 which is normally energized is connected to a supply line 26 having fluid under pressure and which extends to a shut-off valve 27. The shut-off valve 27 has a pressure responsive member 28 selectively subject to supply pressure through a line 29 extending from the isolation/reset solenoid valve. The isolation/reset valve 25 is shown positioned to block flow from the supply line 26 to the line 29 whereby the shut-off valve is positioned to block supply pressure reaching a line 30 extending to a manual control valve 31 and a line 32 branching from the line 30. The line 32 extends to a priority valve 33 which is spring-urged to the position shown. A branch line 34 extends from the line 32 to an enable solenoid valve 35 which is shown in an deenergized position. A line 36 extends from the enable solenoid 35 to the upper end of the priority valve 33 as seen in the Figure. In the position shown, the enable solenoid valve 35 blocks communication between the lines 34 and 36. Another branch line 37 extends from the line 32 to a hydraulic latch 38.

With the shut-off valve 27 open, fluid flow to the motor 20 is controlled by either an electro-hydraulic servo valve 40 or through the manual control valve 31. When the control is by the electro-hydraulic servo valve 40, the flow to and from the motor is through a plurality of lines including the lines 41 and 42 extending from the electro-hydraulic servo valve 40 to the priority valve 33. As seen in the Figure, both of these lines 41 and 42 are blocked from communication with port lines 43 and 44 connected with motor ports of the motor 20. The control of flow by the manual flow valve is through lines 45 and 46 extending between the manual control valve 31 and the priority valve 33, and as shown in the Figure, lines 45 and 46 are in communication with the port lines 43 and 44. There is no actual flow in the position shown, since the manual control valve 31 is positioned to block line 30 extending from the shut-off valve 27 from communication with the lines 45 and 46.

When the electro-hydraulic servo valve 40 is to control flow and pressure to the motor 20, the electro-hydraulic servo valve is supplied with pressure fluid by flow through line 32 and the priority valve 33 to a line 50 which extends to a pressure sensing indicator 51 and has a branch 52 connected to the electro-hydraulic servo valve. A return line 54 connects with the electro-hydraulic servo valve 40 through a line 55 and also connects with the manual control valve through a line 56 and with the hydraulic latch 38 through a line 57.

The manual control valve 31 is manually operable by movement of a member 60 which in a flight control actuation system would be pilot operated. This member is pivoted at 61 to a movable tubular member 62 which is generally symmetrical at both sides of the member 60 and which constitutes a mechanical interconnection between hydraulic system No. 1 and hydraulic system No. 2. The tubular member 62 is spring urged to a centered position by springs 63 and 64 and has spring loaded mechanical rod connections 65 and 66 extending to the manual control valve 31 of hydraulic system No. 1, and a manual control valve 70 of hydraulic system No. 2. The member 60 is caused to pivot about the pivot 61 corresponding to movement of the member 10 through operation of a mechanical feedback connection (not shown), which connects to the member 60 at 71 and, which results in pivoting of the member about the pivot 61. This pivoting movement does not result in any movement of the tubular member 62 which is connected to the manual control valves 31 and 70.

When emergency control is to be implemented by pilot operation of the member 60, the member 60 will then pivot about the point 71 and cause corresponding movement of the tubular member 62 and the manual control valves 31 and 70.

Hydraulic system No. 2 has the same components as hydraulic system No. 1. An isolation-reset solenoid valve 75 is connected to the supply line 76 and controls the operation of the shut-off valve 77. In the Figure, hydraulic system No. 2 is shown in an operative mode with operation of the motor 21 to drive the member 10. In this position, the shut-off valve 77 has the pressure responsive spool 78 shifted because of pressure in line **78*a* whereby hydraulic fluid under pressure can flow to a line 79 with an extension 81 thereof extending to a priority valve 80. An end of the priority valve 80 is exposed to pressure through a line 81*a* supplied with pressure through an energized enable solenoid valve 82 which is positioned to permit flow as supplied through a line 83 connected to the line 79**.

Pressure applied to an end of the priority valve 80 shifts the priority valve spool upwardly as viewed in the Figure against the action of a spring 85 whereby hydraulic fluid can flow through the priority valve to a line 86 which connects to the pressure sensing indicator 87 and to an electro-hydraulic servo valve 88. The electro-hydraulic servo valve 88 is under the control of a flight control computer for controlling flow and pressure to the motor 21 through lines 89 and 90 which extend to the priority valve 80 and there is flow through the priority valve to port lines 91 and 92 connected to the motor 21. Line 93 extends from the pressure line 79 to a hydraulic latch 94.

The manual control valve 70 previously referred to is connected to the outlet side of the shut-off valve 77 through a line 95 but as positioned in the Figure, does not have any control of flow and pressure to the motor 21. When the manual control valve is operative, it controls flow to the motor through lines 96 and 97 which extend from the manual control valve to the priority valve 80. A return line 100 connects to the hydraulic latch 94 through a line **100*a*, to the manual control valve 70 through a line 101, and to the electro-hydraulic servo valve 88 through a line 102. With hydraulic system No. 2 in operation as shown in the Figure, hydraulic fluid under pressure is supplied to the motor 21 under the control of the electro-hydraulic servo valve 88** which responds to commands from a flight control computer. This sets the output speed of the motor depending upon the position of the motor wobbler plate to be described.

The hydraulic motors 20 and 21 are of the variable displacement type and as shown particularly are of the axial piston type having a variably positionable wobbler plate for setting motor displacement. More particularly, the hydraulic motor 20 has a rotatable cylinder block 110 carrying a series of reciprocal pistons with the stroke of the pistons being set by the angle of a pivoted wobbler plate 111. This type of variable displacement hydraulic motor is well known in the art. The cylinder block 110 is connected to the output shaft 17 of the motor whereby rotation of the cylinder block results in rotating the gear 15 of the torque summing gear train.

The motor 21 is of a similar construction having a rotatable cylinder block 115 carrying reciprocal pistons, the stroke of which is controlled by a pivoted wobbler plate 116. The cylinder block 115 is connected to the motor output shaft 18.

The construction of the hydraulic motors 20 and 21 is well known in the art whereby with a predetermined flow through the motor, the output speed of the motor is determined by the displacement of the motor as set by the position of the motor wobbler plate. The wobbler plates 111 and 116 are interconnected by a U-shaped link 120 which is pivotally connected at its ends to ends of the wobbler plates remote from the pivotal mounting of the wobbler plates. The link 120 establishes a fixed relation between the positions of the wobbler plates. As shown in the Figure, the link 120 is positioned to position the wobbler plate 116 for operation of the motor 21 at full displacement while the wobbler plate 111 is positioned for operation of the motor 20 at zero displacement. The link 120 can move to two other positions with a position furthest to the right from that shown in the Figure being one in which the wobbler plate 116 is set for zero displacement for the motor 21 and the wobbler plate 111 is set for full displacement operation for the motor 20. There is an intermediate position between that last described and that shown in the Figure wherein each of the wobbler plates 111 and 116 are positioned to establish a displacement setting for each of the motors which is one-half of the full displacement of the motor. These three positions for each of the wobbler plates are identified by the legends F, $\frac{1}{2}$ and 0 in the Figure.

In operation, either of the hydraulic systems No. 1 or No. 2 can be utilized to drive the member 10. The components of hydraulic system No. 2 are positioned for use in the Figure, while hydraulic system No. 1 is inactive and, in operation, the motor 20 free-wheels. In the event that hydraulic system No. 1 is to take over from hydraulic system No. 2, the condition of the isolation/rest solenoid valve 75 is changed, and the condition of the enable solenoid 82 is also changed to cut off the supply to pressure fluid to the system and drain line 81*a* to a return line. Priority valve spring 85 resets the priority valve 80 to a position which blocks the lines 89 and 90 extending from the electro-hydraulic servo valve to the priority valve from communication with the port lines 91 and 92 of the motor 21.

The isolation/reset solenoid valve 25 is deenergized to apply pressure to and to shift the shut-off valve 27 whereby the priority valve 33 is shifted against a priority valve spring 33*a* to the position illustrated for hydraulic system No. 2 in the Figure. This places the motor 20 under the control of electro-hydraulic servo valve 40.

This operation also requires a shift in the relation of the wobbler plates 111 and 116 to have the wobbler plate 111 positioned to set full displacement for the motor 20 and the wobbler plate 116 positioned to set zero displacement for the motor 21 whereby the latter motor can free-wheel. This is achieved by varying the pressure conditions at a wobbler control piston indicated generally at 130.

When motor 21 is operating, pressure is applied to the right hand of a control piston section 131 with a space at the other side thereof being bled through a bleed line 132. A piston shaft 133 is connected to the link 120 and is held in a left-hand position by pressure against the urging of a spring 134. When operation is to be through hydraulic system No. 1, the line 135 which supplies pressure to the right hand side of the control piston section 131 is connected to return whereby pressure is released from the right hand side of the control piston section 131 and the spring 134 is effective to move the rod 133 and the link 120 to their extreme right positions where, as shown by the legends, the wobbler plate 111 sets full displacement and the wobbler plate 116 sets zero displacement.

When the power drive unit is to be placed into manual mechanical command operation, the isolation/reset solenoid valves 25 and 75 are deenergized and there is delivery of supply pressure to lines 32 and 79 with the enable solenoid valves 35 and 82 deenergized and blocking delivery of pressure to the ends of the priority valves 33 and 80 whereby the priority valves are positioned as shown for priority valve 33 in the Figure. The manual control valves 31 and 70 are connected to supply pressure and movement of the member 60 about the pivot point 71 in either direction causes shift of the tubular member 62 in one direction or the other to shift the spools of the manual control valves 31 and 70. Assuming the member 60 is moved in a clockwise direction, pressure fluid in hydraulic system No. 1 flows to line 45 which connects to the port line 44 for the motor 20 through the priority valve 33. The motor port line 43 connects to the line 46 leading back to the manual control valve and to return line 54 through the line 56.

In hydraulic system No. 2, fluid under pressure reaches the motor 21 from line 95 by flow through line 97 extending to the priority valve 80 and through motor port line 92. Return flow from motor port line 91 passes through the priority valve 80 to the line 96 and the flow connects with the return lines 100 and 101 through the manual control valve 70. The position of the member 60 controls flow and pressure to the motors 20 and 21.

In the mechanical operation, the wobbler plates 111 and 116 are at their positions to establish one-half of full displacement for each of the motors and which is an intermediate position of the link 120. This results in a ratio change in the hydraulic motors to provide the velocity summing in the hydraulics as previously described. With the setting of the motor displacements at one-half of full displacement, the speed of each motor is twice the speed when the motor is operating at full displacement.

The setting of the motors at one-half of full displacement is achieved by pressure control at the wobbler control piston. More particularly, the tubular member 62 associated with the manually movable member 60 has a pair of double ramp cams positioned one at each end thereof and identified at 150 and 151 and which coact with movable rods 152 and 153 respectively, which have a ball at their end coacting with a double ramp cam. When the tubular member 62 moves in either direction from the center position shown in the Figure, both of the rods 152 and 153 are caused to move to the right against the urging of springs associated with the spools of the hydraulic latches 38 and 94 and pressure oil in lines 37 and 93, respectively, act to latch the hydraulic latches in their right hand positions. Oil flows through the diagonal slots in the valve members to a pair of lines 160 and 161.

The line 160 directs pressure to the spring side of the priority valve 33 and also to a line 162 leading to the wobbler control piston chamber to act against a large diameter piston section 163 of the control piston which is loose on the piston rod 133. Pressure in line 135 acts on the right hand side of the smaller diameter of the control piston section 131. With the larger area of the piston section 163 the piston 163 abuts the right hand wall of the chamber to limit movement of the control piston section 131 to the left and locate the piston rod 133 to position the mechanical link 120 in the middle position to set one-half displacement of each of the motors. The line 161 extends to the spring side of the priority valve 80. The pressure in lines 160 and 161 are directed to the spring ends of the priority valves 33 and 80 respectively to assure a shift of the priority valves to the position as shown for priority valve 33 in the FIGURE whereby the control of the motors is from the manual control valves 31 and 70. The enable solenoids 35 and 82 are conditioned to connect priority valve lines 36 and 81*a* to return.

Although the spring 134 can function to shift the control link 120 to its extreme right position when there is no pressure on the control piston section 131, the spring is not effective when there is pressure acting on both the piston section 131 and 163 whereby the link 120 is set in its middle position.

A two motor system has been described. There could be three or more motors and each motor would have displacement settings equal to the number of motors plus 1. For example, in a three motor system each motor would have the following displacements: zero, $\frac{1}{3}$, $\frac{1}{2}$ and full.

We claim:

1. A multiple displacement motor driven power drive unit utilizing a torque summing gear train having an output for driving a member and plural motor inputs and wherein the unit operates with the power efficiency of a velocity summing gear train driven by plural motors comprising, a pair of variable displacement hydraulic motors in separate independent hydraulic circuits and each connected to an input side of said torque summing gear train, each of said variable displacement hydraulic motors having an adjustable wobbler plate for setting motor displacement at or between zero and full displacement, interconnecting means fixing the relation between said wobbler plates whereby when one wobbler plate is at full displacement-setting position the other wobbler plate is at zero displacement-setting position, and means for establishing three different conditions of said interconnecting means wherein in two of said conditions one or the other of the wobbler plates is at full displacement-setting position and in the third condition both of the wobbler plates are positioned to set one-half of full displacement of the motors.

2. A multiple displacement motor driven power drive unit as defined in claim 1 wherein said interconnecting means includes a mechanical connection between the adjustable wobbler plates, a movable pressure-responsive control piston connected to said mechanical connection and a fluid connection from each hydraulic circuit one to each side of said control piston whereby said control piston senses and is positioned responsive to the pressure condition in said hydraulic circuits.

3. A multiple displacement motor driven power drive unit as defined in claim 1 wherein said interconnecting means comprises a movable interconnecting linkage fixing the relation between said wobbler plates whereby when one wobbler plate is at full displacement-setting position the other wobbler plate is at zero displacement-setting position, and means for setting said movable linkage in three positions wherein in two of said positions one or the other of the wobbler plates is at full displacement-setting position and in the third position both of the wobbler plates are positioned to set one-half of full displacement of the motors.

4. A multiple displacement motor driven power drive unit for driving a member comprising, a pair of variable displacement hydraulic motors having their output shafts operatively connected to said member, each of said motors having an adjustable device for setting motor displacement, means interconnecting said adjustable devices and having three operative settings, said operative settings including a first setting wherein one motor is at full displacement and the other motor is at zero displacement, a second setting in which the displacement of the motors is reversed, and a third setting wherein both motors are at one-half full displacement, and means for controlling the operative setting of said interconnecting means.

5. A multiple displacement motor driven power drive unit for driving a member comprising, a torque summing gear train connected to said member, a pair of variable displacement hydraulic motors each having an output shaft connected to said torque-summing gear train and a wobbler plate positionable to set the displacement of the associated motor, an independent hydraulic circuit for each motor, means for setting either of said motors to full displacement and supplying pressure fluid thereto while simultaneously setting the other of said motors to zero displacement and blocking supply of pressure fluid to said other motor to have the motor at full displacement drive the member while said other motor free-wheels, and means for setting both motors at one-half of full displacement and supplying pressure fluid to both motors to have both motors drive the member through the torque-summing gear train, and said means for setting displacement of the motors includes a link connecting the wobbler plates of the motors and a control piston operatively connected to the link.

6. A multiple displacement motor driven power drive unit as defined in claim 5, wherein said control piston is spring-urged to a position wherein the motor in one of the hydraulic circuits is at full displacement when said one hydraulic circuit is operative and the other motor is at zero displacement, means in the other of said hydraulic circuits for applying pressure to said control piston when the other hydraulic circuit is operative to shift the control piston and link against spring force to a second position wherein the motor in said other hydraulic circuit is at full displacement.

7. A multiple displacement motor driven power drive unit as defined in claim 6 wherein said control piston when subject to pressure from both hydraulic circuits has an intermediate position to set both motors at one-half of full displacement.

8. A multiple displacement motor driven power drive unit comprising: a first hydraulic circuit having a variable displacement hydraulic motor; a second hydraulic circuit having a variable displacement hydraulic motor; a torque summing gear train connected to the outputs of both motors; each of said hydraulic circuits having an electrically controllable servo valve selectively operable for controlling fluid flow to the motor and a manual control valve selectively operable to control flow to the motor, and a priority valve to establish which of said valves will control operation of the motor; said motors each having a plurality of preestablished displacement settings which are related to the settings of the other motor including a first setting wherein one motor is at full displacement and the other motor is at zero displacement, a second setting where the relation between the motors is reversed and a third setting where both motors are at an intermediate displacement; means for causing one or the other of the hydraulic circuits to be operable and set the motor of the operable circuit at approximate full displacement and under the control of the servo valve; and means for causing operation of both circuits under the control of the manual control valves and for placing both motors at said intermediate displacement.

9. A multiple displacement motor driven power drive unit as defined in claim 8 wherein said intermediate displacement is one-half of full displacement.

10. A multiple displacement motor driven power drive unit as defined in claim 9 including a control piston movable to establish the displacement settings of the motors, and said control piston being exposed to the pressure conditions in said hydraulic circuits to establish the displacement settings of said motors.

11. A multiple displacement motor driven power drive unit as defined in claim 9 wherein each of said motors has an adjustable wobbler plate for setting motor displacement, a movable link interconnecting said wobbler plates in a relation whereby when one wobbler plate is at full displacement-setting position the other wobbler plate is at zero displacement-setting position, and means for setting said movable link in three positions wherein in two of said positions one or the other of the wobbler plates is at full displacement-setting position and in the third position both of the wobbler plates are positioned to set one-half of full displacement of the motors.

* * * * *